US008108122B2

(12) United States Patent
Ezaki

(10) Patent No.: US 8,108,122 B2
(45) Date of Patent: Jan. 31, 2012

(54) SIX-CYLINDER ENGINE

(75) Inventor: Shuichi Ezaki, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 561 days.

(21) Appl. No.: 12/365,427

(22) Filed: Feb. 4, 2009

(65) Prior Publication Data

US 2009/0223484 A1 Sep. 10, 2009

(30) Foreign Application Priority Data

Mar. 7, 2008 (JP) ................................ 2008-057716

(51) Int. Cl.
*G06F 19/00* (2011.01)
*F01L 1/34* (2006.01)
*F02M 25/07* (2006.01)
*F02D 13/06* (2006.01)

(52) U.S. Cl. ................ 701/103; 123/198 F; 123/90.15; 123/568.14

(58) Field of Classification Search ............... 123/90.11, 123/90.15–90.18, 198 F, 315, 316, 347, 348, 123/481, 568.14; 701/101–103, 108, 10, 701/112

See application file for complete search history.

(56) References Cited

U.S. PATENT DOCUMENTS 7,823,551 B2 * 11/2010 Ezaki ........................ 123/90.16
7,831,375 B2 * 11/2010 Shinagawa .................... 701/108
2009/0248277 A1 * 10/2009 Shinagawa et al. ........... 701/103
2009/0248278 A1 * 10/2009 Nakasaka ..................... 701/103

FOREIGN PATENT DOCUMENTS

JP 4-171271 6/1992
JP 8-114133 5/1996
JP 2003-343229 12/2003
JP 2005-90408 4/2005
JP 2007-9766 1/2007
JP 2007-23793 2/2007
JP 2007-162607 6/2007

OTHER PUBLICATIONS

Office Action issued on Aug. 30, 2011 in the corresponding Japanese Application No. 2008-057716.

* cited by examiner

*Primary Examiner* — Willis Wolfe, Jr.

(74) *Attorney, Agent, or Firm* — Oblon, Spivak, McClelland, Maier & Neustadt, L.L.P.

(57) ABSTRACT

A six-cylinder engine includes a stop-cylinder-setting section. The stop-cylinder-setting section sets to-be-stopped cylinders such that cylinders operated in a four-cylinder operation mode (two cylinders stopped) are stopped in a two-cylinder operation mode (four cylinders stopped), and the cylinders operated in the two-cylinder operation mode are stopped in the four-cylinder operation mode. The stop-cylinder-setting section stops operations of intake valves corresponding to stopped cylinders in each operation mode.

12 Claims, 5 Drawing Sheets

SIX-CYLINDER ENGINE

BACKGROUND OF THE INVENTION

1. Field of the Invention

The present invention relates to a six-cylinder engine capable of changing the number of operating cylinders in accordance with operation conditions.

2. Description of the Related Art

Engines of such a type are disclosed in, for example, Japanese Patent Application Laid-open (kokai) Nos. H08-114133, 2005-90408, 2007-23793, and 2007-162607.

Such an engine (in particular, a V-type or horizontally-opposed-type six-cylinder engine) has problems such as vibration, noise, and difficulty in heat management in a selected cylinder operation state in which some of the cylinders are stopped.

For example, if the positions of cylinders operating in the selected cylinder operation state are not balanced, vibration and/or noise may increase. Further, when specific cylinders are operated continuously for a long period of time or continuously stopped for a long period of time, heat is not generated uniformly within the engine block, so that the uniformity of temperature distribution within the engine block is impaired. Therefore, friction loss may increase due to distortion, or ignitability and/or air-fuel ratio may vary among the cylinders. Moreover, variation of exhaust gas temperature may result in difficulty in satisfactorily performing temperature control for exhaust gas purification catalyst.

SUMMARY OF THE INVENTION

The present invention has been accomplished to overcome the above-mentioned problems. That is, an object of the present invention is to provide a six-cylinder engine (in particular, a V-type or horizontally-opposed-type six-cylinder engine) which can operate in a state in which some cylinders are stopped and which has better characteristics.

A six-cylinder engine to which the present invention is applied is a four cycle engine configured such that the number of operating cylinders can be changed in accordance with operating conditions. Specifically, the six-cylinder engine may be a V-type or horizontally-opposed-type six-cylinder engine which includes a first-bank cylinder group and a second-bank cylinder group. The first-bank cylinder group includes a first-bank first cylinder, a first-bank second cylinder, and a first-bank third cylinder, which are disposed in parallel with one another. These cylinders are arranged in a row along a cylinder arrangement direction. The second-bank cylinder group includes a second-bank first cylinder, a second-bank second cylinder, and a second-bank third cylinder, which are disposed in parallel with one another. These cylinders are arranged in a row along the cylinder arrangement direction. Each cylinder of the second-bank cylinder group is provided such that an angle greater than 0 degree but not greater than 180 degrees is formed between the center axis of the cylinder and that of a corresponding cylinder of the first-bank cylinder group (the first-bank first cylinder, the first-bank second cylinder, or the first-bank third cylinder).

The feature of the six-cylinder engine of the present invention resides in setting to-be-stopped cylinders (hereinafter referred to as “stop cylinders”) such that four selected cylinders are stopped and the remaining two cylinders are operated in a two-cylinder operation mode, and the four selected cylinders are operated and the remaining two cylinders are stopped in a four-cylinder operation mode. That is, the six-cylinder engine of the present invention has a unique stop-cylinder-setting section. The stop-cylinder-setting section sets stop cylinders such that the cylinders operated in the four-cylinder operation mode are stopped in the two-cylinder operation mode, and the cylinders operated in the two-cylinder operation mode are stopped in the four-cylinder operation mode. In the present invention, the stop-cylinder-setting section stops operations of the intake valves corresponding to the stop cylinders in each operation mode. Notably, the stop-cylinder-setting section may be configured to stop the first-bank cylinder group or the second-bank cylinder group in a three-cylinder operation mode in which three cylinders are stopped.

In the six-cylinder engine of the present invention having the above-described configuration, since operations of the intake valves corresponding to stop cylinders are stopped, actual intake operation does not take place in the intake strokes of the stop cylinders. Thus, pumping loss in the (ineffectual) intake strokes can be reduced. Further, the stop cylinders (operating cylinders) are switched between the two-cylinder operation mode and the four-cylinder operation mode. As a result, an imbalance in terms of use of cylinders for combustion can be suppressed to a possible extent. Thus, satisfactory heat management can be performed in contrast to the case where specific cylinders are continuously operated for a long period of time or continuously stopped for a long period of time. As described above, the six-cylinder engine of the present invention has a fuel consumption property better than that of a conventional six-cylinder engine which can operates with some cylinder stopped.

Preferably, the stop-cylinder-setting section is configured to stop the first-bank third cylinder and the second-bank first cylinder, which are located diagonally opposite each other, in the four-cylinder operation mode, and stop the first-bank first and second cylinders and the second-bank second and third cylinders in the two-cylinder operation mode.

By virtue of the above-described configuration, cylinders which are located diagonally opposite each other are operated in each of the four-cylinder operation mode and the two-cylinder operation mode. That is, symmetry of operating cylinders can be secured. Further, in the two-cylinder operation mode, combustion (expansion) occurs at constant intervals.

Therefore, by virtue of the above-described configuration, vibration and noise generated when the engine is operated with some cylinders stopped can be mitigated. Further, since symmetry of heat generation portions is secured to a possible extent, satisfactory heat management can be performed.

The stop-cylinder-setting section may include a plurality of intake-valve-operation changeover sections and a pressure control section. In this case, each of the intake-valve-operation changeover sections is configured to stop and resume operation of the intake valve of the corresponding cylinder in accordance with the state of supply of pressurized working fluid (e.g., pressurized oil) thereto. Further, the pressure control section is configured to control the state of supply of the pressurized working fluid to the plurality of intake-valve-operation changeover sections. Specifically, the stop-cylinder-setting section may be configured as follows.

The stop-cylinder-setting section includes a first-bank first intake-valve-operation changeover section, a first-bank second intake-valve-operation changeover section, a first-bank third intake-valve-operation changeover section, a second-bank first intake-valve-operation changeover section, a second-bank second intake-valve-operation changeover section, a second-bank third intake-valve-operation changeover section, a first-bank first pressure control section, a first-bank second pressure control section, a second-bank first pressure control section, a second-bank second pressure control section, and an operation control section.

The first-bank first intake-valve-operation changeover section is configured to stop and resume operation of a first-bank first intake valve corresponding to the first-bank first cylinder in accordance with the state of supply of the pressurized fluid. The first-bank second intake-valve-operation changeover section is configured to stop and resume operation of a first-bank second intake valve corresponding to the first-bank second cylinder in accordance with the state of supply of the pressurized fluid. The first-bank third intake-valve-operation changeover section is configured to stop and resume operation of a first-bank third intake valve corresponding to the first-bank third cylinder in accordance with the state of supply of the pressurized fluid. The second-bank first intake-valve-operation changeover section is configured to stop and resume operation of a second-bank first intake valve corresponding to the second-bank first cylinder, which is located diagonally opposite the first-bank third cylinder, in accordance with the state of supply of the pressurized fluid. The second-bank second intake-valve-operation changeover section is configured to stop and resume operation of a second-bank second intake valve corresponding to the second-bank second cylinder in accordance with the state of supply of the pressurized fluid. The second-bank third intake-valve-operation changeover section is configured to stop and resume operation of a second-bank third intake valve corresponding to the second-bank third cylinder, which is located diagonally opposite the first-bank first cylinder, in accordance with the state of supply of the pressurized fluid.

The first-bank first pressure control section controls the state of supply of the pressurized fluid to the first-bank first intake-valve-operation changeover section and the first-bank second intake-valve-operation changeover section such that the first-bank first intake valve and the first-bank second intake valve are interlocked with each other for stoppage and resumption of their operations. The first-bank second pressure control section controls the state of supply of the pressurized fluid to the first-bank third intake-valve-operation changeover section. The second-bank first pressure control section controls the state of supply of the pressurized fluid to the second-bank first intake-valve-operation changeover section. The second-bank second pressure control section controls the state of supply of the pressurized fluid to the second-bank second intake-valve-operation changeover section and the second-bank third intake-valve-operation changeover section such that the second-bank second intake valve and the second-bank third intake valve are interlocked with each other for stoppage and resumption of their operations.

The operation control section is configured to set the states of the intake valves as follows by controlling operations of the pressure control sections.

(1) In the six-cylinder operation mode, operations of all the intake valves are resumed (all the intake valves are permitted to open and close in accordance with the stroke of the engine).

(2) In the four-cylinder operation mode, operations of the first-bank third intake valve and the second-bank first intake valve are stopped, and operations of the remaining intake valves are resumed.

(3) In the three-cylinder operation mode, operations of the first-bank first through third intake valves or the second-bank first through third intake valves are stopped.

(4) In the two-cylinder operation mode, operations of the first-bank third intake valve and the second-bank first intake valve are resumed, and operations of the remaining intake valves are stopped.

By virtue of the above-described configuration, the two-cylinder and four-cylinder operation modes in which the operating cylinders are located diagonally opposite each other and the three-cylinder operation mode in which three cylinders arranged straight are operated can be realized by use of the four pressure control sections. That is, these operation modes can be realized by use of a simple apparatus structure.

The stop-cylinder-setting section may further include a first-bank intake rocker shaft, a first intake-valve-control-flow-passage dividing section, a second-bank intake rocker shaft, and a second intake-valve-control-flow-passage dividing section. The first-bank intake rocker shaft extends along the cylinder arrangement direction so as to face the first-bank first through third intake-valve-operation changeover sections. A first-bank intake valve control flow passage through which the working fluid can pass extends in the first-bank intake rocker shaft along the cylinder arrangement direction. The first intake-valve-control-flow-passage dividing section is provided so as to divide the first-bank intake valve control flow passage into a portion corresponding to the first-bank first and second intake-valve-operation changeover sections and a portion corresponding to the first-bank third intake-valve-operation changeover section (such that communication between the two portions becomes impossible or difficult). The second-bank intake rocker shaft extends along the cylinder arrangement direction so as to face the second-bank first through third intake-valve-operation changeover sections. A second-bank intake valve control flow passage through which the working fluid can pass extends in the second-bank intake rocker shaft along the cylinder arrangement direction. The second intake-valve-control-flow-passage dividing section is provided so as to divide the second-bank intake valve control flow passage into a portion corresponding to the second-bank first intake-valve-operation changeover section and a portion corresponding to the second-bank second and third intake-valve-operation changeover sections. The first-bank first through third intake-valve-operation changeover sections are connected to the first-bank first and second pressure control sections via the first-bank intake valve control flow passage. The second-bank first through third intake-valve-operation changeover sections are connected to the second-bank first and second pressure control sections via the second-bank intake valve control flow passage. Notably, in this case, preferably, the intake-valve-operation changeover sections are mounted to the corresponding intake rocker shafts and receive the working fluid via the intake rocker shafts.

Preferably, the stop-cylinder-setting section is configured to stop operations of exhaust valves corresponding to stop cylinders in each operation mode.

In the six-cylinder engine of the present invention having the above-described configuration, since operations of intake valves and exhaust valves corresponding to stop cylinders are stopped, pumping loss can be reduced further. Accordingly, a selected cylinder operation which effectively reduces fuel consumption can be realized.

The stop-cylinder-setting section may further include a plurality of exhaust-valve-operation changeover sections, each of which stops and resumes operation of the exhaust valve of the corresponding cylinder in accordance with the state of supply of the pressurized working fluid, wherein the pressure control section controls the state of supply of the pressurized working fluid to the plurality of exhaust-valve-operation changeover sections to thereby stop operations of exhaust valves corresponding to stop valves in each operation mode. That is, in this case, the stop-cylinder-setting section includes a first-bank first exhaust-valve-operation changeover section, a first-bank second exhaust-valve-operation changeover section, a first-bank third exhaust-valve-operation changeover section, a second-bank first exhaust-valve-operation changeover section, a second-bank second exhaust-valve-operation changeover section, and a second-bank third exhaust-valve-operation changeover section.

The first-bank first exhaust-valve-operation changeover section is configured to stop and resume operation of a first-bank first exhaust valve corresponding to the first-bank first cylinder in accordance with the state of supply of the pressurized fluid. The first-bank second exhaust-valve-operation changeover section is configured to stop and resume operation of a first-bank second exhaust valve corresponding to the first-bank second cylinder in accordance with the state of supply of the pressurized fluid. The first-bank third exhaust-valve-operation changeover section is configured to stop and resume operation of a first-bank third exhaust valve corresponding to the first-bank third cylinder in accordance with the state of supply of the pressurized fluid. The second-bank first exhaust-valve-operation changeover section is configured to stop and resume operation of a second-bank first exhaust valve corresponding to the second-bank first cylinder in accordance with the state of supply of the pressurized fluid. The second-bank second exhaust-valve-operation changeover section is configured to stop and resume operation of a second-bank second exhaust valve corresponding to the second-bank second cylinder in accordance with the state of supply of the pressurized fluid. The second-bank third exhaust-valve-operation changeover section is configured to stop and resume operation of a second-bank third exhaust valve corresponding to the second-bank third cylinder in accordance with the state of supply of the pressurized fluid.

The stop-cylinder-setting section may further include a first-bank exhaust rocker shaft, a first exhaust-valve-control-flow-passage dividing section, a second-bank exhaust rocker shaft, and a second exhaust-valve-control-flow-passage dividing section. The first-bank exhaust rocker shaft extends along the cylinder arrangement direction so as to face the first-bank first through third exhaust-valve-operation changeover sections. A first-bank exhaust valve control flow passage through which the working fluid can pass extends in the first-bank exhaust rocker shaft along the cylinder arrangement direction. The first exhaust-valve-control-flow-passage dividing section is provided so as to divide the first-bank exhaust valve control flow passage into a portion corresponding to the first-bank first and second exhaust-valve-operation changeover sections and a portion corresponding to the first-bank third exhaust-valve-operation changeover section. The second-bank exhaust rocker shaft extends along the cylinder arrangement direction so as to face the second-bank first through third exhaust-valve-operation changeover sections. A second-bank exhaust valve control flow passage through which the working fluid can pass extends in the second-bank exhaust rocker shaft along the cylinder arrangement direction. The second exhaust-valve-control-flow-passage dividing section is provided so as to divide the second-bank exhaust valve control flow passage into a portion corresponding to the second-bank first exhaust-valve-operation changeover section and a portion corresponding to the second-bank second and third exhaust-valve-operation changeover sections. The first-bank first through third exhaust-valve-operation changeover sections are connected to the first-bank first and second pressure control sections via the first-bank exhaust valve control flow passage. The second-bank first through third exhaust-valve-operation changeover sections are connected to the second-bank first and second pressure control sections via the second-bank exhaust valve control flow passage. Notably, in this case, preferably, the exhaust-valve-operation changeover sections are mounted to the corresponding exhaust rocker shafts and receive the working fluid via the exhaust rocker shafts.

DETAILED DESCRIPTION OF THE PREFERRED EMBODIMENT

An embodiment of the present invention (the best mode contemplated by the applicant at the time of filing the present application) will next be described with reference to the drawings.

Notably, the following description of the embodiment merely describes a concrete example of the present invention specifically to a possible extent so as to satisfy requirements regarding a specification (requirement regarding description and requirement regarding practicability) required under the law. Therefore, as described below, the present invention is not limited to the specific structure of the embodiment which will be described below. Various modifications of the present embodiment are described together at the end of the specification, because understanding of the consistent description of the embodiment is hindered if such modifications are inserted into the description of the embodiment.

<Structure of the Engine of the Embodiment>

Figure 1:
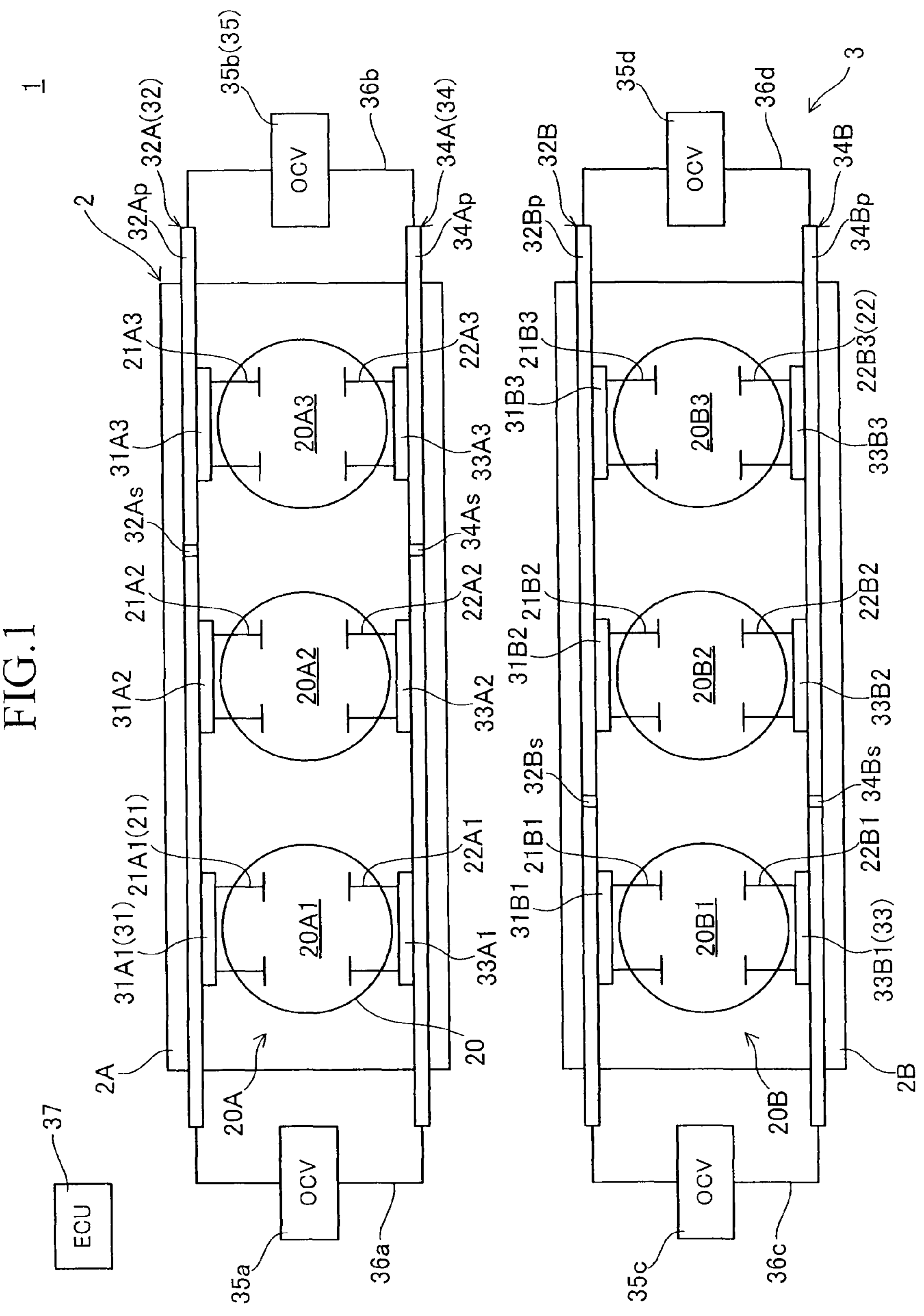
FIG. 1 is a schematic view showing the structure of a four-cycle, V-type six-cylinder reciprocating engine according to an embodiment of the present invention.

FIG. 1 is a schematic view showing the structure of a four-cycle, V-type six-cylinder reciprocating engine 1 according to the present embodiment (hereinafter simply referred to as the "engine 1"). This engine 1 is configured such that it can change the number of operating cylinders in accordance with operating conditions (engine speed and load). As shown in FIG. 1, the engine 1 includes an engine block 2 (including an A-bank 2A and a B-bank 2B), and a stop-cylinder-setting section 3.

<<Engine Block>>

In the engine block 2, the A-bank 2A and the B-bank 2B are provided such that they form a V-like shape as viewed from a side. Three cylinders 20 are provided in each of the banks 2A and 2B.

That is, an A-bank cylinder group 20A is provided in the A-bank 2A. This A-bank cylinder group 20A includes a cylinder 20A1 (hereinafter simply referred to as the "A1 cylinder"), a cylinder 20A2 (hereinafter simply referred to as the "A2 cylinder"), and a cylinder 20A3 (hereinafter simply referred to as the "A3 cylinder"), which are disposed in parallel with one another. These A1 to A3 cylinders are arranged in a row along a cylinder arrangement direction (the left-right direction in FIG. 1).

Similarly, a B-bank cylinder group 20B is provided in the B-bank 2B. This B-bank cylinder group 20B includes a cylinder 20B1 (hereinafter simply referred to as the "B1 cylinder"), a cylinder 20B2 (hereinafter simply referred to as the "B2 cylinder"), and a cylinder 20B3 (hereinafter simply referred to as the "B3 cylinder"), which are disposed in parallel with one another. These B1 to B3 cylinders are arranged in a row along the above-mentioned cylinder arrangement direction.

Pairs of intake valves 21 (21A1, 21A2, 21A3, 21B1, 21B2, and 21B3) and pairs of exhaust valves 22 (22A1, 22A2, 22A3, 22B1, 22B2, and 22B3) are provided so as to correspond to the A1 cylinder, the A2 cylinder, the A3 cylinder, the B1 cylinder, the B2 cylinder, and the B3 cylinder, respectively.

<<Stop-Cylinder-Setting Section>>

The stop-cylinder-setting section 3 in the present embodiment is configured to set to-be-stopped cylinders (hereinafter may be referred to as "stop cylinders") as follows in a four-cylinder operation mode (an operation mode in which two cylinders are stopped), a three-cylinder operation mode (an operation mode in which three cylinders are stopped), and a two-cylinder operation mode (an operation mode in which four cylinders are stopped).

(1) In the four-cylinder operation mode: the A3 cylinder and the B1 cylinder located diagonally opposite the A3 cylinder are stopped.

(2) In the two-cylinder operation mode: the A1 cylinder, the A2 cylinder, the B2 cylinder, and the B3 cylinder are stopped.

(3) In the three-cylinder operation mode: the A-bank cylinder group 20A and the B-bank cylinder group 20B are alternately stopped.

The stop-cylinder-setting section 3 in the present embodiment is configured to stop the operations of the intake valves 21 and the exhaust valves 22 corresponding to the stop cylinders (to cause the intake valves 21 and the exhaust valves 22 to maintain their closed states). Specifically, the stop-cylinder-setting section 3 is configured as follows.

<<<Intake Valve Side>>>

The stop-cylinder-setting section 3 includes an intake-valve-operation changeover section 31. This intake-valve-operation changeover section 31 is configured to bring the intake valves 21 into a stopped state (a closed state) when oil having a predetermined high pressure (pressurized oil) is supplied thereto, and to cancel the stopped state of the intake valves 21 when the supply of the oil is stopped (permit the open/close operation of the intake valves 21 in accordance with the engine stroke). Since the structure of the intake-valve-operation changeover section 31 (e.g., a structure for establishing and breaking connection between a main rocker arm and a sub rocker arm in accordance with the state of supply of oil; see, for example, Japanese Patent Application Laid-Open (kokai) No. H5-248216; which is incorporated by reference herein in its entirety) is well known, the structure of the intake-valve-operation changeover section 31 will not be described herein.

In the engine 1 of the present embodiment, a plurality of intake-valve-operation changeover sections 31 (31A1, 31A2, 31A3, 31B1, 31B2, and 31B3) are provided such that they correspond to the intake valves 21A1, 21A2, 21A3, 21B1, 21B2, and 21B3. These intake-valve-operation changeover sections 31 are mounted onto intake rocker shafts 32, and receive oil via the intake rocker shafts 32.

Specifically, on the side of the A-bank 2A, an intake rocker shaft 32A is provided along the above-described cylinder arrangement direction such that it faces the intake-valve-operation changeover sections 31A1, 31A2, and 31A3. An oil passage 32Ap is formed in the intake rocker shaft 32A so as to supply oil to the intake-valve-operation changeover sections 31A1, 31A2, and 31A3. The oil passage 32Ap extends along the cylinder arrangement direction. Further, an oil passage dividing section 32As is provided in the intake rocker shaft 32A. The oil passage dividing section 32As divides the oil passage 32Ap into a portion corresponding to the intake-valve-operation changeover sections 31A1 and 31A2 and a portion corresponding to the intake-valve-operation changeover section 31A3 such that the two portions do not communicate with each other.

Similarly, on the side of the B-bank 2B, an intake rocker shaft 32B is provided such that it faces the intake-valve-operation changeover sections 31B1, 31B2, and 31B3. An oil passage 32Bp is formed in the intake rocker shaft 32B so as to supply oil to the intake-valve-operation changeover sections 31B1, 31B2, and 31B3. Further, an oil passage dividing section 32Bs is provided in the intake rocker shaft 32B. The oil passage dividing section 32Bs divides the oil passage 32Bp into a portion corresponding to the intake-valve-operation changeover section 31B1 and a portion corresponding to the intake-valve-operation changeover sections 31B2 and 31B3 such that the two portions do not communicate with each other.

<<<Exhaust Valve Side>>>

The stop-cylinder-setting section 3 further includes exhaust-valve-operation changeover sections 33 (33A1, 33A2, 33A3, 33B1, 33B2, and 33B3) and exhaust rocker shafts 34 (34A and 34B). The exhaust-valve-operation changeover sections 33 and the exhaust rocker shafts 34 are configured in the same manner as the intake-valve-operation changeover sections 31 and the intake rocker shafts 32.

That is, the exhaust rocker shaft 34A includes an oil passage 34Ap and an oil-passage dividing section 34As. The oil passage dividing section 34As divides the oil passage 34Ap into a portion corresponding to the exhaust-valve-operation changeover sections 33A1 and 33A2 and a portion corresponding to the exhaust-valve-operation changeover section 33A3 such that the two portions do not communicate with each other. Further, the exhaust rocker shaft 34B includes an oil passage 34Bp and an oil-passage dividing section 34Bs. The oil passage dividing section 34Bs divides the oil passage 34Bp into a portion corresponding to the exhaust-valve-operation changeover section 33B1 and a portion corresponding to the exhaust-valve-operation changeover sections 33B2 and 33B3 such that the two portions do not communicate with each other.

<<<Pressure Control Section>>

Oil-pressure control valves 35, which correspond to the pressure control sections of the present invention, are connected to an unillustrated oil supply source (high pressure pump or the like), and control the state of supply of oil to the intake-valve-operation changeover sections 31 and the exhaust-valve-operation changeover sections 33 via the oil passages 32Ap, 32Bp, 34Ap, and 34Bp provided in the intake rocker shafts 32 and the exhaust rocker shafts 34. Specifically, in the present embodiment, four oil-pressure control valves 35_a_, 35_b_, 35_c_, and 35_d_ are provided. These oil-pressure control valves 35_a_, 35_b_, 35_c_, and 35_d_ are composed of solenoid valves.

The oil-pressure control valve 35_a_ is connected to the portion of the oil passage 32Ap corresponding to the intake-valve-operation changeover sections 31A1 and 31A2 and the portion of the oil passage 34Ap corresponding to the exhaust-valve-operation changeover sections 33A1 and 33A2 via an oil passage 36_a_, and control the state of supply of oil to these portions. The oil-pressure control valve 35_b_ is connected to the portion of the oil passage 32Ap corresponding to the intake-valve-operation changeover section 31A3 and the portion of the oil passage 34Ap corresponding to the exhaust-valve-operation changeover section 33A3 via an oil passage 36_b_, and control the state of supply of oil to these portions.

That is, the oil-pressure control valve 35*a* stops and resumes the operations of the intake valves 21A1 and 21A2 and the exhaust valves 22A1 and 22A2 in an interlocked manner. Further, the oil-pressure control valve 35*b* stops and resumes the operations of the intake valves 21A3 and the exhaust valves 22A3 in an interlocked manner.

The oil-pressure control valve 35*c* is connected to the portion of the oil passage 32Bp corresponding to the intake-valve-operation changeover section 31B1 and the portion of the oil passage 34Bp corresponding to the exhaust-valve-operation changeover section 33B1 via an oil passage 36*c*, and control the state of supply of oil to these portions. The oil-pressure control valve 35*d* is connected to the portion of the oil passage 32Bp corresponding to the intake-valve-operation changeover sections 31B2 and 31B3 and the portion of the oil passage 34Bp corresponding to the exhaust-valve-operation changeover section 33B2 and 33B3 via an oil passage 36*d*, and control the state of supply of oil to these portions. That is, the oil-pressure control valve 35*c* stops and resumes the operations of the intake valves 21B1 and the exhaust valves 22B1 in an interlocked manner. Further, the oil-pressure control valve 35*d* stops and resumes the operations of the intake valves 21B2 and 21B3 and the exhaust valves 22B2 and 22B3 in an interlocked manner.

<<<Operation Control Section>>>

An engine electronic control unit 37 (hereinafter simply referred to as the "ECU 37"), which corresponds to the operation control section of the present invention, controls various portions of the engine 1 so as to (1) perform fuel injection and ignition in the sequence of the A1 cylinder->the B2 cylinder->the A3 cylinder->the B3 cylinder->the A2 cylinder->the B1 cylinder in a six-cylinder operation mode, and (2) stop fuel injection and ignition for corresponding stop cylinders in the above-described three selected cylinder operation modes. Further, the ECU 37 stops operations of the intake valves 21 and the exhaust valves 22 of the stop cylinders by controlling the operations of the oil-pressure control valves 35*a*, 35*b*, 35*c*, and 35*d*. Specifically, the ECU 37 is electrically connected to the oil-pressure control valves 35*a*, 35*b*, 35*c*, and 35*d*, and opens and closes these valves in accordance with operating conditions.

<Operation of the Engine of the Embodiment>

Operation of the engine 1 of the present embodiment will now be described. FIGS. 2 to 5 are schematic views showing operating states of the engine 1 shown in FIG. 1. In FIGS. 2 to 5, portions of the oil passages 32Ap, etc. supplied with oil of high pressure are darkened. Further, stop cylinders are denoted by broken lines.

Figure 2:
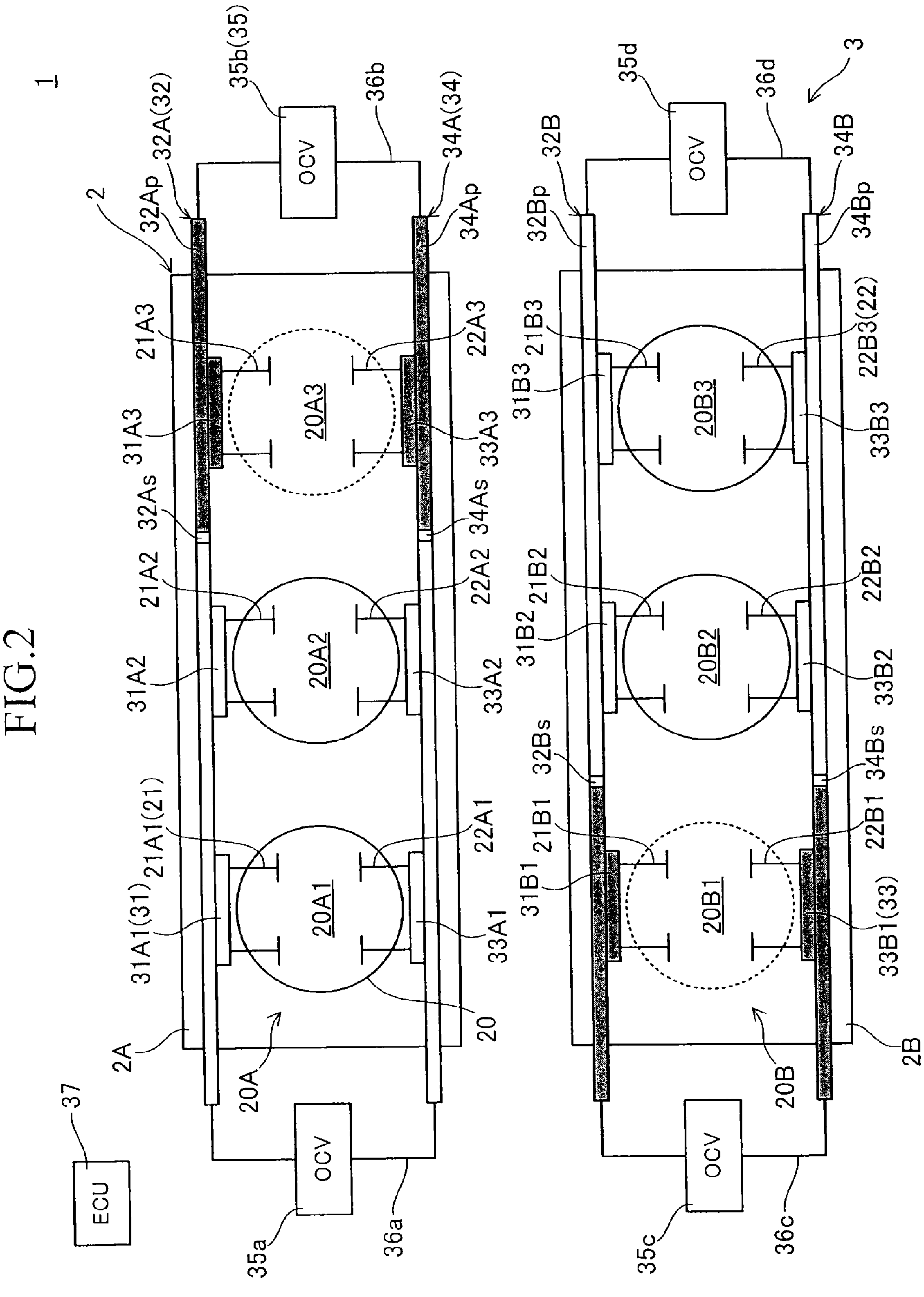
FIG. 2 is a schematic view showing an operating state of the engine shown in FIG. 1.

As shown in FIG. 2, in the four-cylinder operation mode, the A3 cylinder and the B1 cylinder, which are diagonally opposite each other, are stopped. At that time, the oil-pressure control valves 35*b* and 35*c* are opened so as to supply the pressurized oil to the intake-valve-operation changeover sections 31A3 and 31B1 and the exhaust-valve-operation changeover sections 33A3 and 33B1. As a result, the intake valves 21A3 and 21B1 and the exhaust valves 22A3 and 22B1 corresponding to the stop cylinders are maintained in a closed state.

Figure 3:
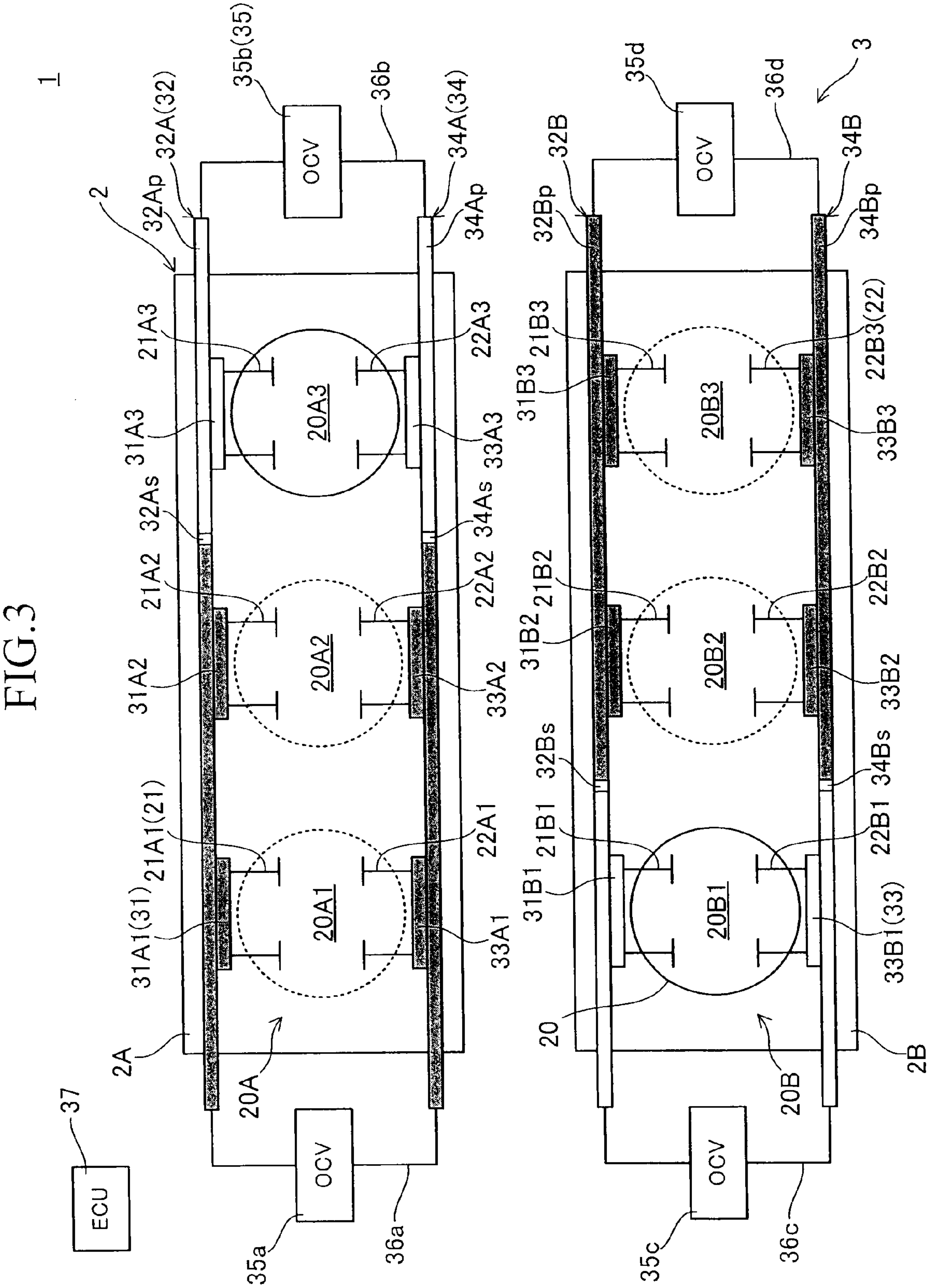
FIG. 3 is a schematic view showing another operating state of the engine shown in FIG. 1.

As shown in FIG. 3, in the two-cylinder operation mode, in contrast to the above-described four-cylinder operation mode, the A3 cylinder and the B1 cylinder, which are diagonally opposite each other, are operated. At that time, these cylinders are operated in accordance with the sequence of A1 (x)->B2 (x)->A3 (o)->B3 (x)->A2 (x)->B1 (o), where "o" represents an operated (ignited) cylinder, and "x" represents a stop cylinder. Thus, a V-type two-cylinder operation is realized such that expansion strokes occur at equal intervals.

In this two-cylinder operation mode, the oil-pressure control valves 35*a* and 35*d* are opened so as to supply the pressurized oil to the intake-valve-operation changeover sections 31A1, 31A2, 31B2, and 31B3 and the exhaust-valve-operation changeover sections 33A1, 33A2 33B2, and 33B3. As a result, in the two-cylinder operation mode, the intake valves 21A1, 21A2, 21B2, and 21B3 and the exhaust valves 22A1, 22A2, 22B2, and 22B3 corresponding to the stop cylinders are maintained in a closed state.

Figure 4:
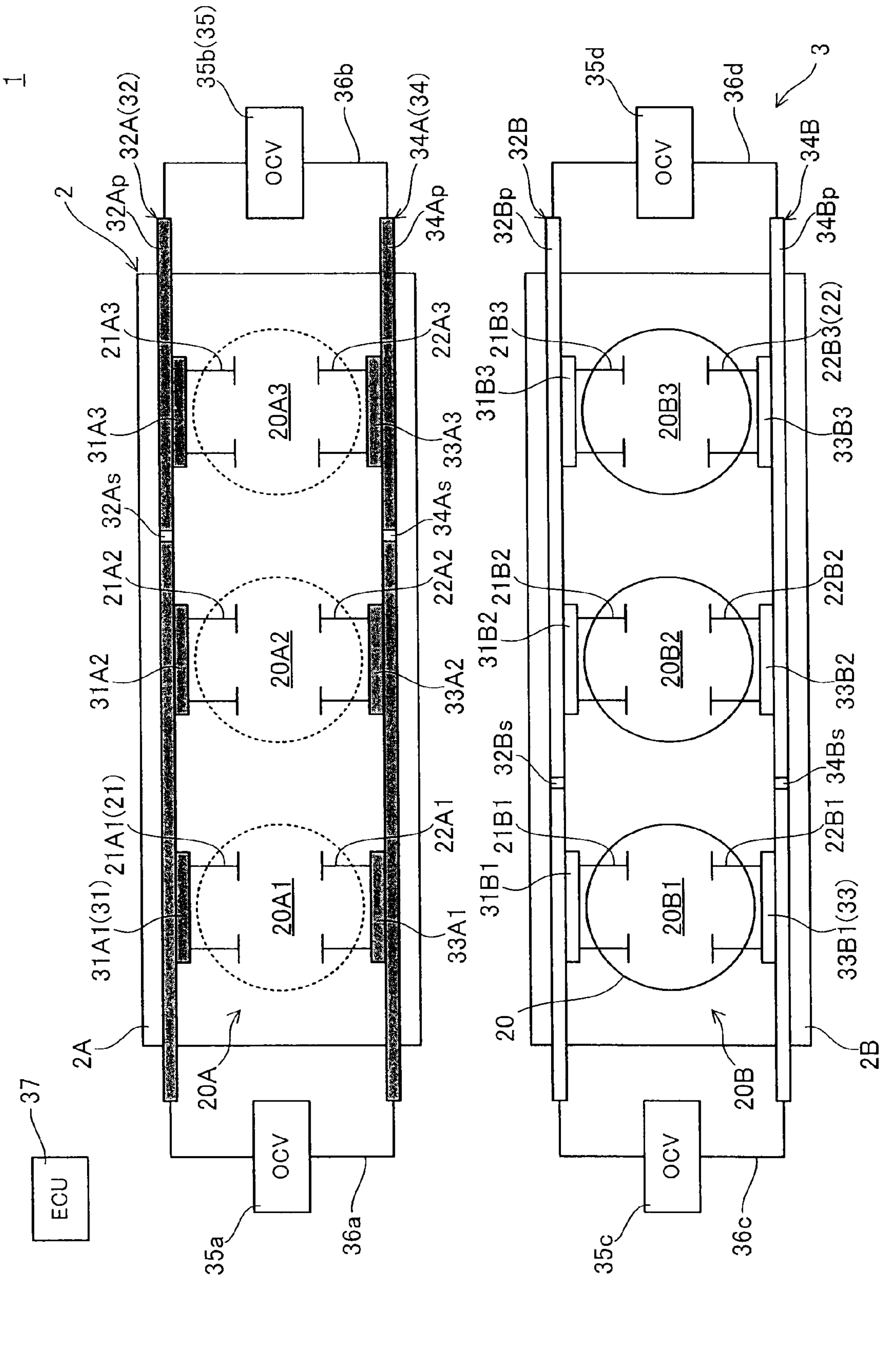
FIG. 4 is a schematic view showing another operating state of the engine shown in FIG. 1.
Figure 5:
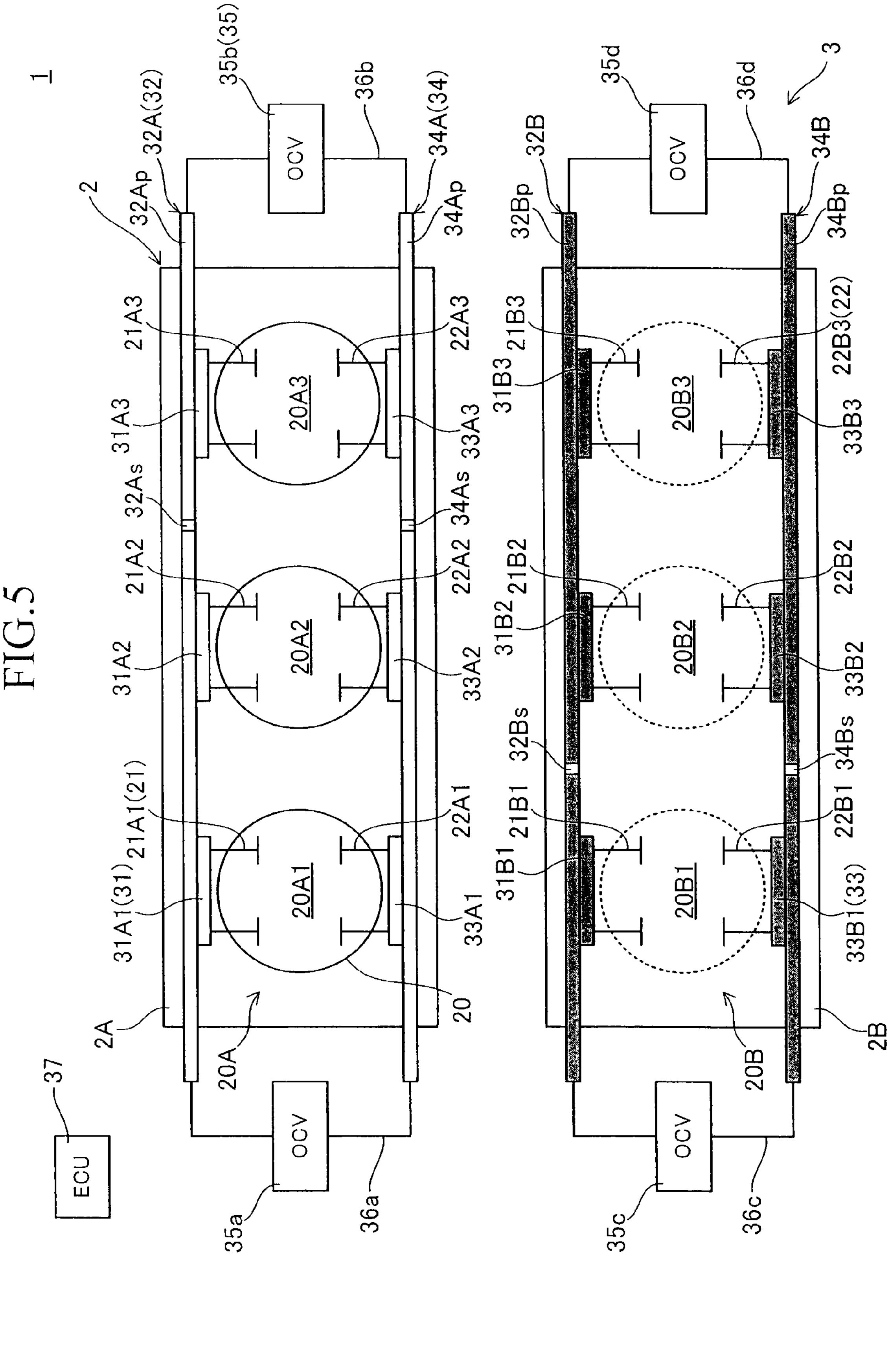
FIG. 5 is a schematic view showing another operating state of the engine shown in FIG. 1.

As shown in FIGS. 4 and 5, in the three-cylinder operation mode, the A-bank cylinder group 20A and the B-bank cylinder group 20B are alternately stopped. That is, in the three-cylinder operation mode at a certain point in time, as shown in FIG. 4, the oil-pressure control valves 35*a* and 35*b* are opened so as to supply the pressurized oil to the intake-valve-operation changeover sections 31A1 to 31A3 and the exhaust-valve-operation changeover sections 33A1 to 33A3. As a result, the intake valves 21A1 to 21A3 and the exhaust valves 22A1 to 22A3 corresponding to the stopped bank; i.e., the A-bank 2A, are maintained in a closed state. When the engine 1 is operated in the three-cylinder operation mode in the next time, as shown in FIG. 5, the oil-pressure control valves 35*c* and 35*d* are opened so as to supply the pressurized oil to the intake-valve-operation changeover sections 31B1 to 31B3 and the exhaust-valve-operation changeover sections 33B1 to 33B3. As a result, the intake valves 21B1 to 21B3 and the exhaust valves 22B1 to 22B3 corresponding to the stopped bank; i.e., the B-bank 2B are maintained in a closed state.

<Effects Accomplished by the Structure of the Embodiment>

In the engine 1 of the present embodiment, since operations of the intake valves 21 and the exhaust valves 22 corresponding to stop cylinders are stopped, pumping loss can be reduced satisfactorily. Thus, a satisfactory fuel consumption rate can be attained.

In the engine 1 of the present embodiment, the stop cylinders (operating cylinders) are switched between the two-cylinder operation mode and the four-cylinder operation mode. As a result, an imbalance in terms of use of cylinders for combustion can be suppressed to a possible extent. Thus, satisfactory heat management can be performed in contrast to the case where specific cylinders are operated continuously for a long period of time or stopped continuously for a long period of time.

In the engine 1 of the present embodiment, the A3 cylinder and the B1 cylinder, which are diagonally opposite each other, are stopped in the four-cylinder operation mode, and operated in the two-cylinder operation mode. Therefore, symmetry of ignited (operating) cylinders is secured, and constant-interval expansion in the two-cylinder operation mode is realized. Accordingly, generation of vibration and noise in these operation modes can be suppressed to a possible extent. Further, since symmetry of heat generation portions is secured to a possible extent, more satisfactory heat management can be performed.

In the engine 1 of the present embodiment, the three-cylinder operation mode, the four-cylinder operation mode, and the constant-interval-expansion two-cylinder operation mode are realized through employment of a very simple apparatus structure including four oil-pressure control valves 35 and a simple flow passage configuration in which the oil passages 32Ap, 32Bp, 34Ap, and 34Bp are merely divided by the oil passage dividing sections 32As, 32Bs, 34As, and 34Bs.

As described above, the present embodiment realizes characteristics better than those of a conventional six-cylinder engine which can be operated with some cylinders stopped, through employment of a simple apparatus structure.

<Modifications>

The above-described embodiment is, as mentioned previously, a mere example of the best mode which the applicant of the present invention contemplated at the time of filing the present application. Therefore, the present invention is not limited to the above-described embodiment. Various modifications to the above-described embodiment are possible so long as the invention is not modified in essence.

Typical modifications will next be exemplified. Needless to say, even modifications are not limited to those exemplified below. The entireties or portions of the embodiment and following modifications are applicable in appropriate combination so long as no technical inconsistencies are involved.

The above-described embodiment and the following modifications should not be construed as limiting the present invention (particularly, those components which partially constitute means for solving the problems to be solved by the invention and are illustrated with respect to operations and functions). Such limiting construal unfairly impairs the interests of an applicant who is motivated to file as quickly as possible under the first-to-file system; unfairly benefits imitators; and is thus impermissible.

The present invention is applicable to gasoline engines, diesel engines, methanol engines, bio-ethanol engines, and other types of engines. No limitation is imposed on the fuel injection scheme (direct injection, port injection, and dual injection employing both these injection methods). Further, the present invention can be suitably applied to an engine 1 in which fuel is supplied by a carburetor rather than by means of fuel injection from an injector. Moreover, the angle formed by the A-bank 2A and the B-bank 2B (an angle between the center axis of the A-bank cylinder group 20A and that of the B-bank cylinder group 20B) may be determined to be greater than 0 degree but not greater than 180 degrees (in the case where the angle is 180 degrees, the engine is called a horizontally opposed engine).

No limitation is imposed on the structure (the intake-valve-operation changeover sections 31, the exhaust-valve-operation changeover sections 33, etc.) for stopping and resuming the operations of the intake valves 21 and the exhaust valves 22. For example, the intake-valve-operation changeover sections 31 and the exhaust-valve-operation changeover sections 33 may be configured to stop the operations of the intake valves 21 and the exhaust valves 22 in response to stoppage of supply of pressurized oil thereto, in contrast to the case of the above-described embodiment.

No limitation is imposed on the structure of the oil passage dividing section 32As, so long as the oil passage dividing section 32As can divide the oil passage 32Ap into a portion corresponding to the intake-valve-operation changeover sections 31A1 and 31A2 and a portion corresponding to the intake-valve-operation changeover section 31A3 such that the two portions substantially do not communicate with each other. That is, the oil passage dividing section 32As is not necessarily required to physically divide the oil passage 32Ap into two portions such that the two portions cannot communicate with each other at all, so long as a sufficient oil pressure difference is produced between the two portions. The same also applies to the other passage dividing sections 32Bs, etc.

Modifications which are not specifically described herein naturally fall within the scope of the present invention, so long as they do not change the essential portion of the present invention.

Those components which partially constitute means for solving the problems to be solved by the invention and are illustrated with respect to operations and functions encompass not only the specific structures disclosed above in the description of the above embodiment and modifications but also any other structures that can implement the operations and functions.

What is claimed is:

1. A six-cylinder engine which includes a first-bank cylinder group composed of a first-bank first cylinder, a first-bank second cylinder, and a first-bank third cylinder arranged in a row along a cylinder arrangement direction and in parallel with one another and a second-bank cylinder group composed of a second-bank first cylinder, a second-bank second cylinder, and a second-bank third cylinder arranged in a row along the cylinder arrangement direction and in parallel with one another, an angle greater than 0 degree but not greater than 180 degrees being formed between center axes of the first-bank first through third cylinders and those of the second-bank first through third cylinders, and which can change the number of operating cylinders in accordance with operating conditions, the engine comprising:

a first-bank first intake-valve-operation changeover section which stops and resumes operation of a first-bank first intake valve corresponding to the first-bank first cylinder in accordance with the state of supply of a pressurized fluid;

a first-bank second intake-valve-operation changeover section which stops and resumes operation of a first-bank second intake valve corresponding to the first-bank second cylinder in accordance with the state of supply of the pressurized fluid;

a first-bank third intake-valve-operation changeover section which stops and resumes operation of a first-bank third intake valve corresponding to the first-bank third cylinder in accordance with the state of supply of the pressurized fluid;

a second-bank first intake-valve-operation changeover section which stops and resumes operation of a second-bank first intake valve corresponding to the second-bank first cylinder, which is located diagonally opposite the first-bank third cylinder, in accordance with the state of supply of the pressurized fluid;

a second-bank second intake-valve-operation changeover section which stops and resumes operation of a second-bank second intake valve corresponding to the second-bank second cylinder in accordance with the state of supply of the pressurized fluid;

a second-bank third intake-valve-operation changeover section which stops and resumes operation of a second-bank third intake valve corresponding to the second-bank third cylinder, which is located diagonally opposite the first-bank first cylinder;

a first-bank first exhaust-valve-operation changeover section which stops and resumes operation of a first-bank first exhaust valve corresponding to the first-bank first cylinder in accordance with the state of supply of the pressurized fluid;

a first-bank second exhaust-valve-operation changeover section which stops and resumes operation of a first-bank second exhaust valve corresponding to the first-bank second cylinder in accordance with the state of supply of the pressurized fluid;

a first-bank third exhaust-valve-operation changeover section which stops and resumes operation of a first-bank third exhaust valve corresponding to the first-bank third cylinder in accordance with the state of supply of the pressurized fluid;

a second-bank first exhaust-valve-operation changeover section which stops and resumes operation of a second-bank first exhaust valve corresponding to the second-bank first cylinder in accordance with the state of supply of the pressurized fluid;

a second-bank second exhaust-valve-operation changeover section which stops and resumes operation of a second-bank second exhaust valve corresponding to the second-bank second cylinder in accordance with the state of supply of the pressurized fluid;

a second-bank third exhaust-valve-operation changeover section which stops and resumes operation of a second-bank third exhaust valve corresponding to the second-bank third cylinder in accordance with the state of supply of the pressurized fluid;

a first-bank first pressure control section which controls the state of supply of the pressurized fluid to the first-bank first intake-valve-operation changeover section, the first-bank first exhaust-valve-operation changeover section, the first-bank second intake-valve-operation changeover section, and the first-bank second exhaust-valve-operation changeover section such that the first-bank first intake valve, the first-bank first exhaust valve, the first-bank second intake valve, and the first-bank second exhaust valve are interlocked with one another for stoppage and resumption of their operations;

a first-bank second pressure control section which controls the state of supply of the pressurized fluid to the first-bank third intake-valve-operation changeover section and the first-bank third exhaust-valve-operation changeover section;

a second-bank first pressure control section which controls the state of supply of the pressurized fluid to the second-bank first intake-valve-operation changeover section and the second-bank first exhaust-valve-operation changeover section;

a second-bank second pressure control section which controls the state of supply of the pressurized fluid to the second-bank second intake-valve-operation changeover section, the second-bank second exhaust-valve-operation changeover section, the second-bank third intake-valve-operation changeover section, and the second-bank third exhaust-valve-operation changeover section such that the second-bank second intake valve, the second-bank second exhaust valve, the second-bank third intake valve, and the second-bank third exhaust valve are interlocked with one another for stoppage and resumption of their operations; and an operation control section which controls operations of the pressure control sections, wherein the operation control section controls the operations of the pressure control sections such that in a six-cylinder operation mode in which all the cylinders are operated, operations of all the intake valves and the exhaust valves are resumed;

in a four-cylinder operation mode in which two cylinders are stopped, operations of the first-bank third intake valve, the first-bank third exhaust valve, the second-bank first intake valve, and the second-bank first exhaust valve are stopped, and operations of the remaining intake and exhaust valves are resumed;

in a three-cylinder operation mode in which three cylinders are stopped, operations of intake and exhaust valves corresponding to the first-bank cylinder group or the intake and exhaust valves corresponding to the second-bank cylinder group are stopped; and in a two-cylinder operation mode in which four cylinders are stopped, operations of the first-bank third intake valve, the first-bank third exhaust valve, the second-bank first intake valve, and the second-bank first exhaust valve are resumed, and operations of the remaining intake and exhaust valves are stopped.

2. A six-cylinder engine according to claim 1, further comprising:

a first-bank intake rocker shaft extending along the cylinder arrangement direction so as to face the first-bank first through third intake-valve-operation changeover sections, the first-bank intake rocker shaft including a first-bank intake valve control flow passage which extends along the cylinder arrangement direction and through which the working fluid can pass;

a first intake-valve-control-flow-passage dividing section which divides the first-bank intake valve control flow passage into a portion corresponding to the first-bank first and second intake-valve-operation changeover sections and a portion corresponding to the first-bank third intake-valve-operation changeover section;

a second-bank intake rocker shaft extending along the cylinder arrangement direction so as to face the second-bank first through third intake-valve-operation changeover sections, the second-bank intake rocker shaft including a second-bank intake valve control flow passage which extends along the cylinder arrangement direction and through which the working fluid can pass;

a second intake-valve-control-flow-passage dividing section which divides the second-bank intake valve control flow passage into a portion corresponding to the second-bank first intake-valve-operation changeover section and a portion corresponding to the second-bank second and third intake-valve-operation changeover sections;

a first-bank exhaust rocker shaft extending along the cylinder arrangement direction so as to face the first-bank first through third exhaust-valve-operation changeover sections, the first-bank exhaust rocker shaft including a first-bank exhaust valve control flow passage which extends along the cylinder arrangement direction and through which the working fluid can pass;

a first exhaust-valve-control-flow-passage dividing section which divides the first-bank exhaust valve control flow passage into a portion corresponding to the first-bank first and second exhaust-valve-operation changeover sections and a portion corresponding to the first-bank third exhaust-valve-operation changeover section;

a second-bank exhaust rocker shaft extending along the cylinder arrangement direction so as to face the second-bank first through third exhaust-valve-operation changeover sections, the second-bank exhaust rocker shaft including a second-bank exhaust valve control flow passage which extends along the cylinder arrangement direction and through which the working fluid can pass; and a second exhaust-valve-control-flow-passage dividing section which divides the second-bank exhaust valve control flow passage into a portion corresponding to the second-bank first exhaust-valve-operation changeover section and a portion corresponding to the second-bank second and third exhaust-valve-operation changeover sections, wherein the first-bank first through third intake-valve-operation changeover sections are connected to the first-bank first and second pressure control sections via the first-bank intake valve control flow passage;

the first-bank first through third exhaust-valve-operation changeover sections are connected to the first-bank first and second pressure control sections via the first-bank exhaust valve control flow passage;

the second-bank first through third intake-valve-operation changeover sections are connected to the second-bank first and second pressure control sections via the second-bank intake valve control flow passage; and the second-bank first through third exhaust-valve-operation changeover sections are connected to the second-bank first and second pressure control sections via the second-bank exhaust valve control flow passage.

3. A six-cylinder engine which includes a first-bank cylinder group composed of a first-bank first cylinder, a first-bank second cylinder, and a first-bank third cylinder arranged in a row along a cylinder arrangement direction and in parallel with one another and a second-bank cylinder group composed of a second-bank first cylinder, a second-bank second cylinder, and a second-bank third cylinder arranged in a row along the cylinder arrangement direction and in parallel with one another, an angle greater than 0 degree but not greater than 180 degrees being formed between center axes of the first-bank first through third cylinders and those of the second-bank first through third cylinders, and which can change the number of operating cylinders in accordance with operating conditions, the engine comprising:

a stop-cylinder-setting section which sets stop cylinders of a two-cylinder operation mode in which four cylinders are stopped and a four-cylinder operation mode in which two cylinders are stopped such that cylinders which are operated in the four-cylinder operation mode are stopped in the two-cylinder operation mode and cylinders which are operated in the two-cylinder operation mode are stopped in the four-cylinder operation mode, wherein the stop-cylinder-setting section stops operations of intake valves corresponding to stop cylinders in each operation mode.

4. A six-cylinder engine according to claim 3, wherein the stop-cylinder-setting section stops the first-bank cylinder group or the second-bank cylinder group in a three-cylinder operation mode in which three cylinders are stopped.

5. A six-cylinder engine according to claim 4, wherein the stop-cylinder-setting section stops the first-bank third cylinder and the second-bank first cylinder, which are located diagonally opposite each other, in the four-cylinder operation mode, and stops the first-bank first and second cylinders and the second-bank second and third cylinders in the two-cylinder operation mode.

6. A six-cylinder engine according to claim 5, wherein the stop-cylinder-setting section includes:

a plurality of intake-valve-operation changeover sections, each being configured to stop and resume operation of the intake valve of the corresponding cylinder in accordance with the state of supply of pressurized working fluid; and a pressure control section which controls the state of supply of the pressurized working fluid to the plurality of intake-valve-operation changeover sections.

7. A six-cylinder engine according to claim 6, wherein the stop-cylinder-setting section stops operations of exhaust valves corresponding to stop cylinders in each operation mode.

8. A six-cylinder engine according to claim 6, wherein the stop-cylinder-setting section includes:

a first-bank first intake-valve-operation changeover section which stops and resumes operation of a first-bank first intake valve corresponding to the first-bank first cylinder in accordance with the state of supply of the pressurized fluid;

a first-bank second intake-valve-operation changeover section which stops and resumes operation of a first-bank second intake valve corresponding to the first-bank second cylinder in accordance with the state of supply of the pressurized fluid;

a first-bank third intake-valve-operation changeover section which stops and resumes operation of a first-bank third intake valve corresponding to the first-bank third cylinder in accordance with the state of supply of the pressurized fluid;

a second-bank first intake-valve-operation changeover section which stops and resumes operation of a second-bank first intake valve corresponding to the second-bank first cylinder, which is located diagonally opposite the first-bank third cylinder, in accordance with the state of supply of the pressurized fluid;

a second-bank second intake-valve-operation changeover section which stops and resumes operation of a second-bank second intake valve corresponding to the second-bank second cylinder in accordance with the state of supply of the pressurized fluid;

a second-bank third intake-valve-operation changeover section which stops and resumes operation of a second-bank third intake valve corresponding to the second-bank third cylinder, which is located diagonally opposite the first-bank first cylinder;

a first-bank first pressure control section which controls the state of supply of the pressurized fluid to the first-bank first intake-valve-operation changeover section and the first-bank second intake-valve-operation changeover section such that the first-bank first intake valve and the first-bank second intake valve are interlocked with each other for stoppage and resumption of their operations;

a first-bank second pressure control section which controls the state of supply of the pressurized fluid to the first-bank third intake-valve-operation changeover section;

a second-bank first pressure control section which controls the state of supply of the pressurized fluid to the second-bank first intake-valve-operation changeover section;

a second-bank second pressure control section which controls the state of supply of the pressurized fluid to the second-bank second intake-valve-operation changeover section and the second-bank third intake-valve-operation changeover section such that the second-bank second intake valve and the second-bank third intake valve are interlocked with each other for stoppage and resumption of their operations; and an operation control section which controls operations of the pressure control sections, wherein the operation control section controls the operations of the pressure control sections such that in a six-cylinder operation mode in which all the cylinders are operated, operations of all the intake valves are resumed;

in the four-cylinder operation mode, operations of the first-bank third intake valve and the second-bank first intake valve are stopped, and operations of the remaining intake valves are resumed;

in a three-cylinder operation mode in which three cylinders are stopped, operations of the first-bank first through third intake valves or the second-bank first through third intake valves are stopped; and in the two-cylinder operation mode, operations of the first-bank third intake valve and the second-bank first intake valve are resumed, and operations of the remaining intake valves are stopped.

9. A six-cylinder engine according to claim 8, wherein the stop-cylinder-setting section further comprises:

a first-bank intake rocker shaft extending along the cylinder arrangement direction so as to face the first-bank first through third intake-valve-operation changeover sections, the first-bank intake rocker shaft including a first-bank intake valve control flow passage which extends along the cylinder arrangement direction and through which the working fluid can pass;

a first intake-valve-control-flow-passage dividing section which divides the first-bank intake valve control flow passage into a portion corresponding to the first-bank first and second intake-valve-operation changeover sections and a portion corresponding to the first-bank third intake-valve-operation changeover section;

a second-bank intake rocker shaft extending along the cylinder arrangement direction so as to face the second-bank first through third intake-valve-operation changeover sections, the second-bank intake rocker shaft including a second-bank intake valve control flow passage which extends along the cylinder arrangement direction and through which the working fluid can pass; and a second intake-valve-control-flow-passage dividing section which divides the second-bank intake valve control flow passage into a portion corresponding to the second-bank first intake-valve-operation changeover section and a portion corresponding to the second-bank second and third intake-valve-operation changeover sections, wherein the first-bank first through third intake-valve-operation changeover sections are connected to the first-bank first and second pressure control sections via the first-bank intake valve control flow passage; and the second-bank first through third intake-valve-operation changeover sections are connected to the second-bank first and second pressure control sections via the second-bank intake valve control flow passage.

10. A six-cylinder engine according to claim 9, wherein the stop-cylinder-setting section further comprises:

a plurality of exhaust-valve-operation changeover sections, each being configured to stop and resume operation of the exhaust valve of the corresponding cylinder in accordance with the state of supply of pressurized working fluid, wherein the pressure control section controls the state of supply of the pressurized working fluid to the plurality of exhaust-valve-operation changeover sections to thereby stop operations of exhaust valves corresponding to stop cylinders in each operation mode.

11. A six-cylinder engine according to claim 10, wherein the stop-cylinder-setting section includes:

a first-bank first exhaust-valve-operation changeover section which stops and resumes operation of a first-bank first exhaust valve corresponding to the first-bank first cylinder in accordance with the state of supply of the pressurized fluid;

a first-bank second exhaust-valve-operation changeover section which stops and resumes operation of a first-bank second exhaust valve corresponding to the first-bank second cylinder in accordance with the state of supply of the pressurized fluid;

a first-bank third exhaust-valve-operation changeover section which stops and resumes operation of a first-bank third exhaust valve corresponding to the first-bank third cylinder in accordance with the state of supply of the pressurized fluid;

a second-bank first exhaust-valve-operation changeover section which stops and resumes operation of a second-bank first exhaust valve corresponding to the second-bank first cylinder in accordance with the state of supply of the pressurized fluid;

a second-bank second exhaust-valve-operation changeover section which stops and resumes operation of a second-bank second exhaust valve corresponding to the second-bank second cylinder in accordance with the state of supply of the pressurized fluid; and a second-bank third exhaust-valve-operation changeover section which stops and resumes operation of a second-bank third exhaust valve corresponding to the second-bank third cylinder in accordance with the state of supply of the pressurized fluid, wherein the first-bank first pressure control section controls the state of supply of the pressurized fluid to the first-bank first exhaust-valve-operation changeover section and the first-bank second exhaust-valve-operation changeover section such that the first-bank first exhaust valve and the first-bank second exhaust valve are interlocked with each other for stoppage and resumption of their operations;

the first-bank second pressure control section controls the state of supply of the pressurized fluid to the first-bank third exhaust-valve-operation changeover section;

the second-bank first pressure control section controls the state of supply of the pressurized fluid to the second-bank first exhaust-valve-operation changeover section;

the second-bank second pressure control section controls the state of supply of the pressurized fluid to the second-bank second exhaust-valve-operation changeover section and the second-bank third exhaust-valve-operation changeover section such that the second-bank second exhaust valve and the second-bank third exhaust valve are interlocked with each other for stoppage and resumption of their operations; and the operation control section controls the operations of the pressure control sections such that in the six-cylinder operation mode, operations of all the intake valves and the exhaust valves are resumed;

in the four-cylinder operation mode, operations of the first-bank third intake valve, the first-bank third exhaust valve, the second-bank first intake valve, and the second-bank first exhaust valve are stopped, and operations of the remaining intake and exhaust valves are resumed;

in the three-cylinder operation mode, operations of the intake and exhaust valves corresponding to the first-bank cylinder group or the intake and exhaust valves corresponding to the second-bank cylinder group are stopped; and in the two-cylinder operation mode, operations of the first-bank third intake valve, the first-bank third exhaust valve, the second-bank first intake valve, and the second-bank first exhaust valve are resumed, and operations of the remaining intake and exhaust valves are stopped.

12. A six-cylinder engine according to claim 11, wherein the stop-cylinder-setting section further comprises:

a first-bank exhaust rocker shaft extending along the cylinder arrangement direction so as to face the first-bank first through third exhaust-valve-operation changeover sections, the first-bank exhaust rocker shaft including a first-bank exhaust valve control flow passage which extends along the cylinder arrangement direction and through which the working fluid can pass;

a first exhaust-valve-control-flow-passage dividing section which divides the first-bank exhaust valve control flow passage into a portion corresponding to the first-bank first and second exhaust-valve-operation changeover sections and a portion corresponding to the first-bank third exhaust-valve-operation changeover section;

a second-bank exhaust rocker shaft extending along the cylinder arrangement direction so as to face the second-bank first through third exhaust-valve-operation changeover sections, the second-bank exhaust rocker shaft including a second-bank exhaust valve control flow passage which extends along the cylinder arrangement direction and through which the working fluid can pass; and a second exhaust-valve-control-flow-passage dividing section which divides the second-bank exhaust valve control flow passage into a portion corresponding to the second-bank first exhaust-valve-operation changeover section and a portion corresponding to the second-bank second and third exhaust-valve-operation changeover sections, wherein the first-bank first through third exhaust-valve-operation changeover sections are connected to the first-bank first and second pressure control sections via the first-bank exhaust valve control flow passage; and the second-bank first through third exhaust-valve-operation changeover sections are connected to the second-bank first and second pressure control sections via the second-bank exhaust valve control flow passage.

* * * * *